United States Patent [19]
Mallory

[11] 3,943,026
[45] Mar. 9, 1976

[54] TIRE BUILDING STITCHER ASSEMBLY

[75] Inventor: Edwin E. Mallory, Niles, Mich.

[73] Assignee: National-Standard Company, Niles, Mich.

[22] Filed: July 12, 1974

[21] Appl. No.: 487,900

[52] U.S. Cl............... 156/410; 156/128 R; 156/421
[51] Int. Cl.²........................................ B29H 17/02
[58] Field of Search ........... 156/398, 402, 409, 410, 156/421, 132, 128

[56] References Cited
UNITED STATES PATENTS

| 1,762,825 | 6/1930 | Lehman .............................. | 156/398 |
|---|---|---|---|
| 1,762,856 | 6/1930 | Desautels............................. | 156/398 |
| 1,862,024 | 6/1932 | Leguillon et al..................... | 156/398 |
| 2,316,369 | 4/1943 | Shook.................................. | 156/402 |
| 2,373,354 | 4/1945 | Sternad et al........................ | 156/398 |
| 2,394,318 | 2/1946 | McChesney ......................... | 156/402 |
| 3,031,353 | 4/1962 | Mallory................................ | 156/402 |
| 3,125,481 | 3/1964 | Mallory et al. ...................... | 156/408 |
| 3,524,784 | 8/1970 | Isaksson et al...................... | 156/402 X |
| 3,546,043 | 12/1970 | Miksch ................................ | 156/410 |
| 3,794,542 | 2/1974 | Colombani et al. ................. | 156/358 |

Primary Examiner—Douglas J. Drummond
Assistant Examiner—John E. Kittle
Attorney, Agent, or Firm—Johnson, Dienner, Emrich & Wagner

[57] ABSTRACT

A stitcher assembly for use in tire building apparatus which apparatus has main frame means and rotatable tire building drum means supported by the main frame means and in turn supporting tire carcass material along with partially applied tread cap and/or sidewall components. The stitcher assembly includes a pair of carrier units, means for supporting and rotating the carrier units relative to the main frame means, a pair of arm assemblies one associated with each of the carrier units and having stitcher wheel means, and means for supporting and linearly moving the arm assemblies within the carrier units.

15 Claims, 20 Drawing Figures

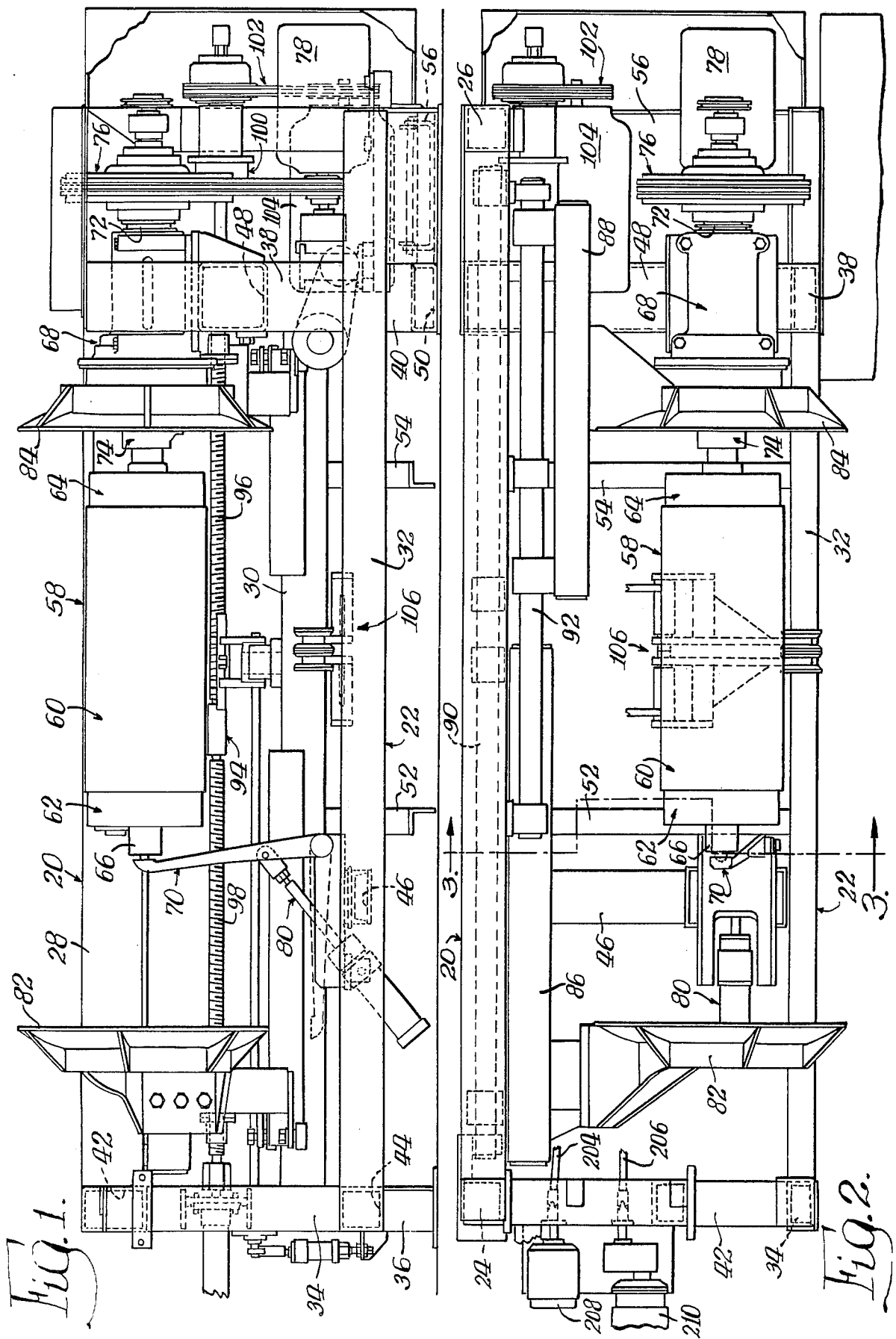

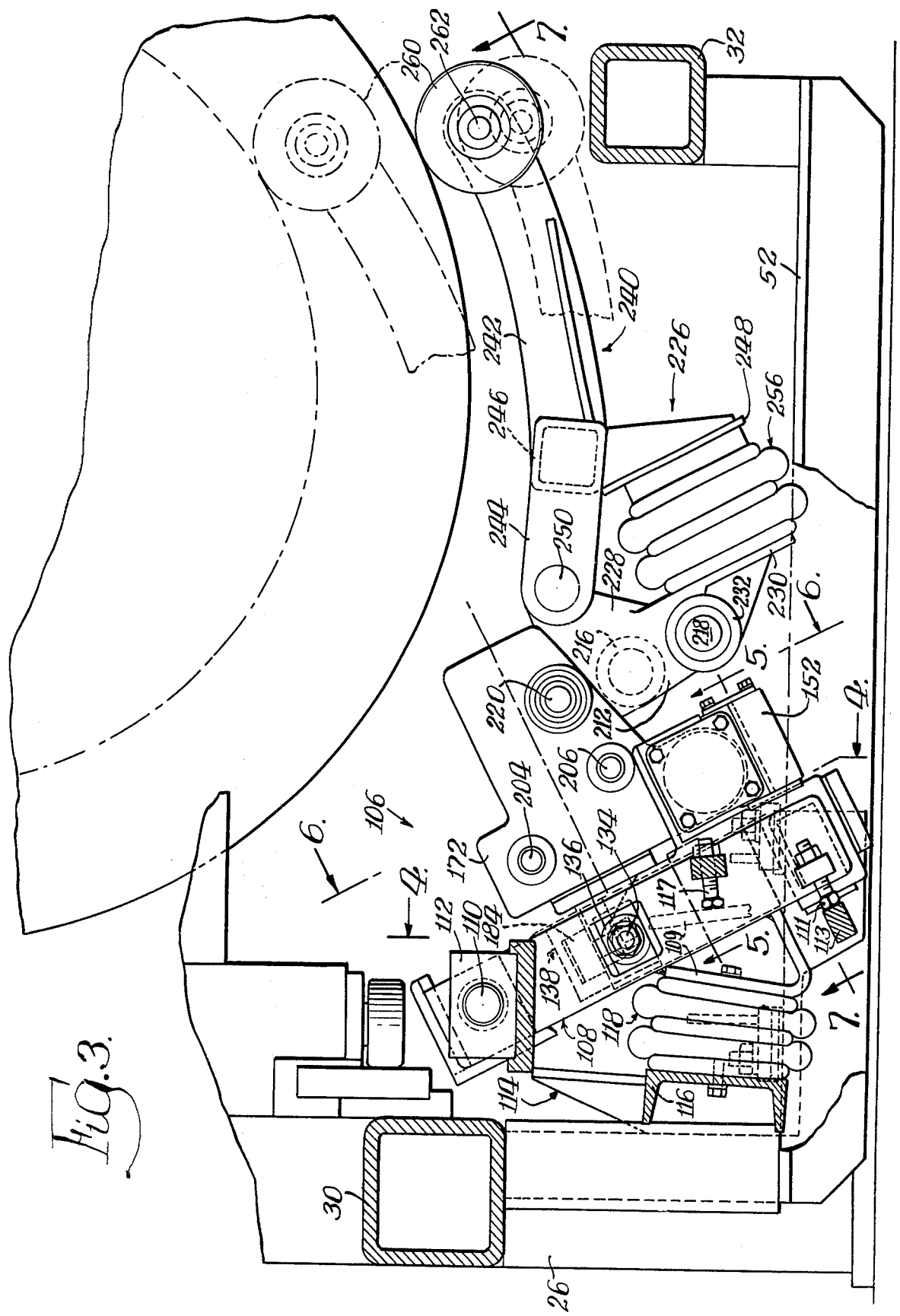

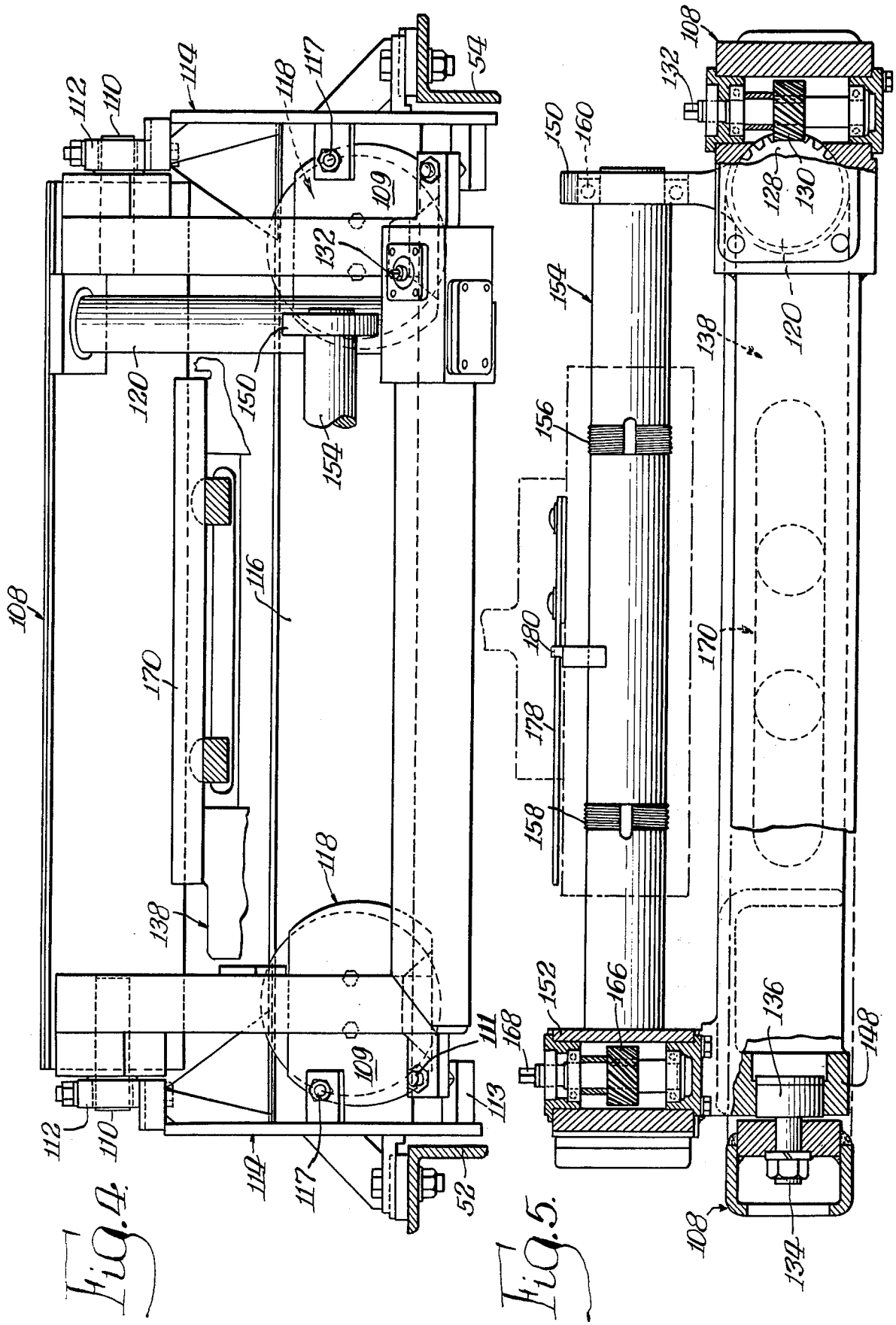

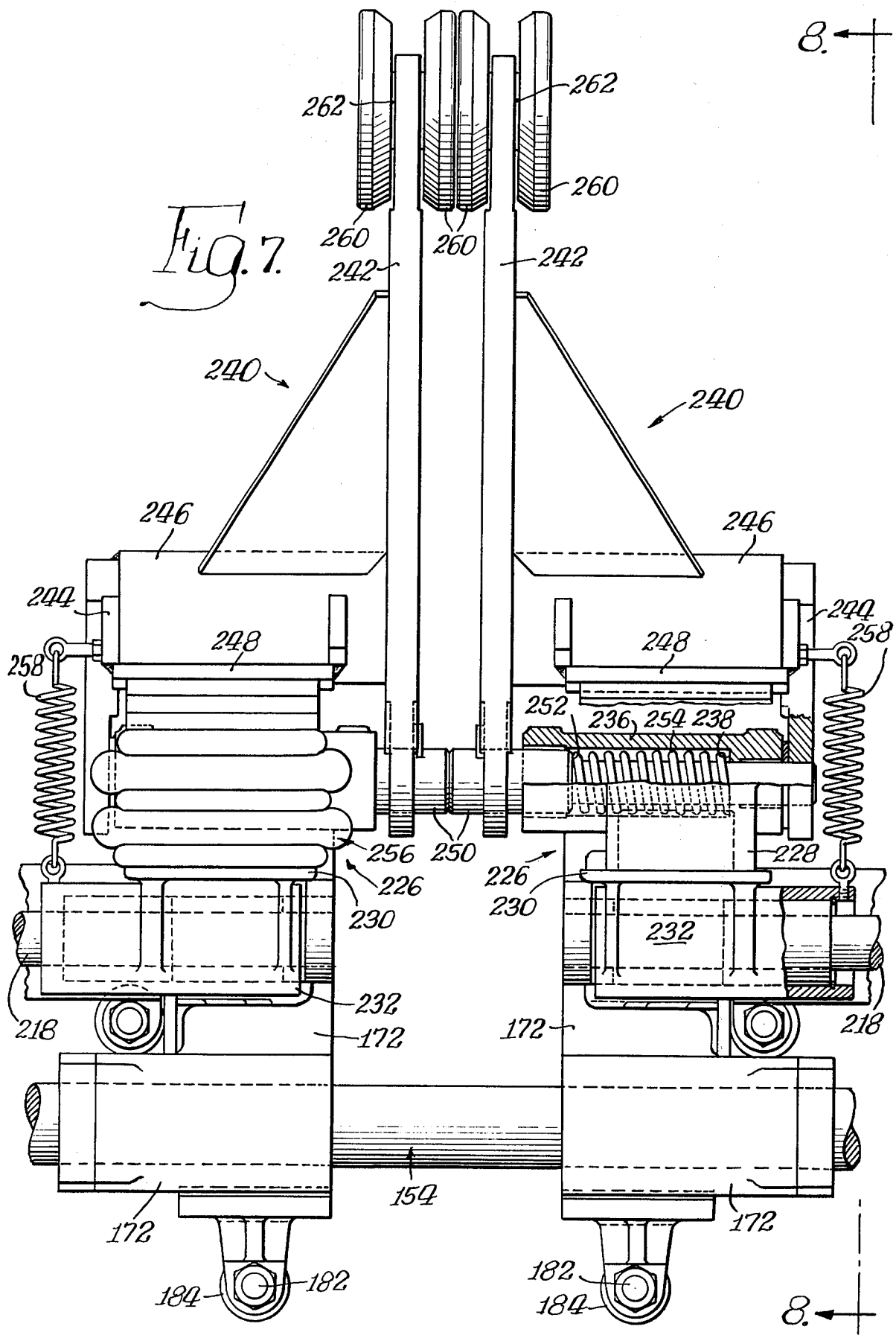

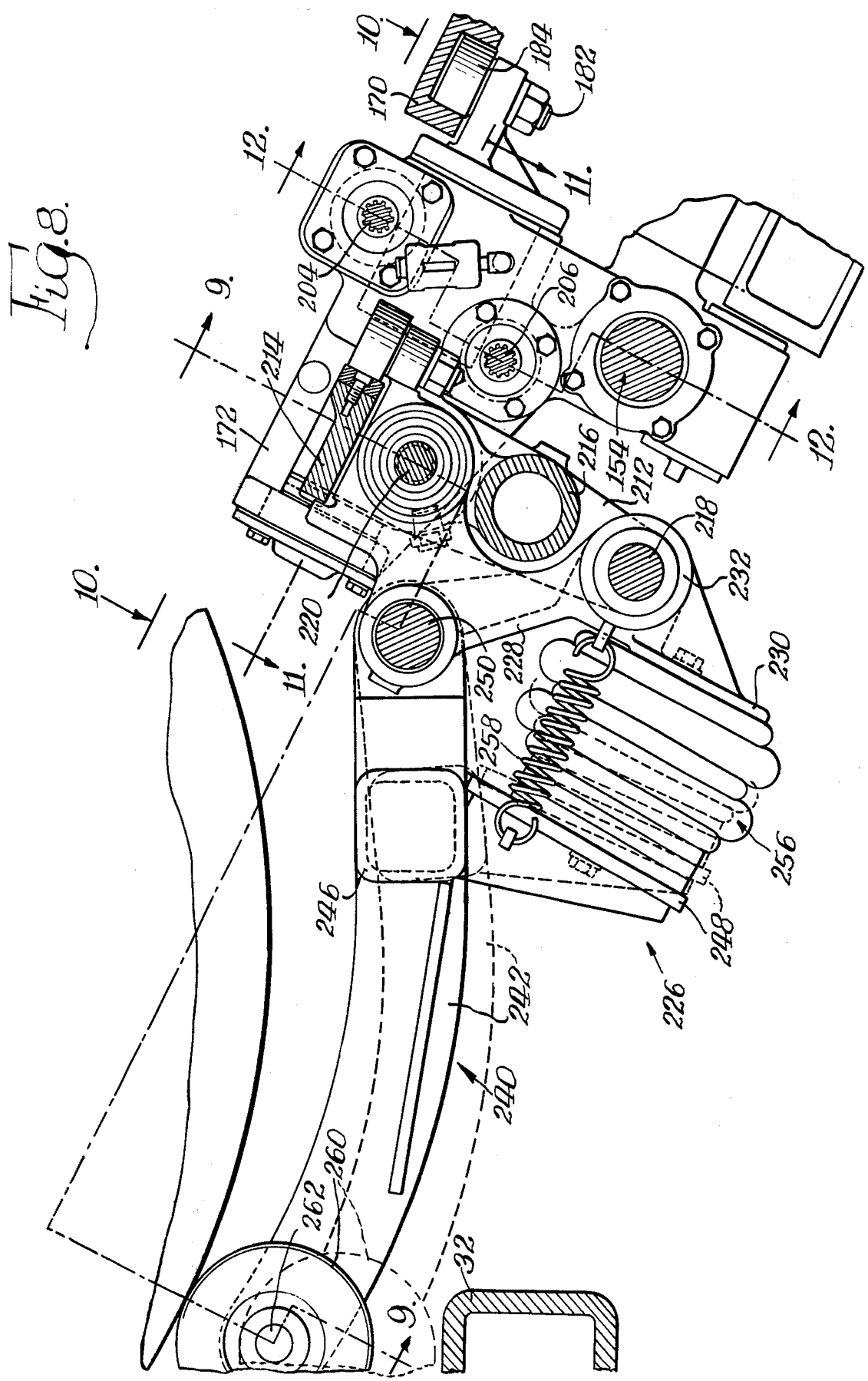

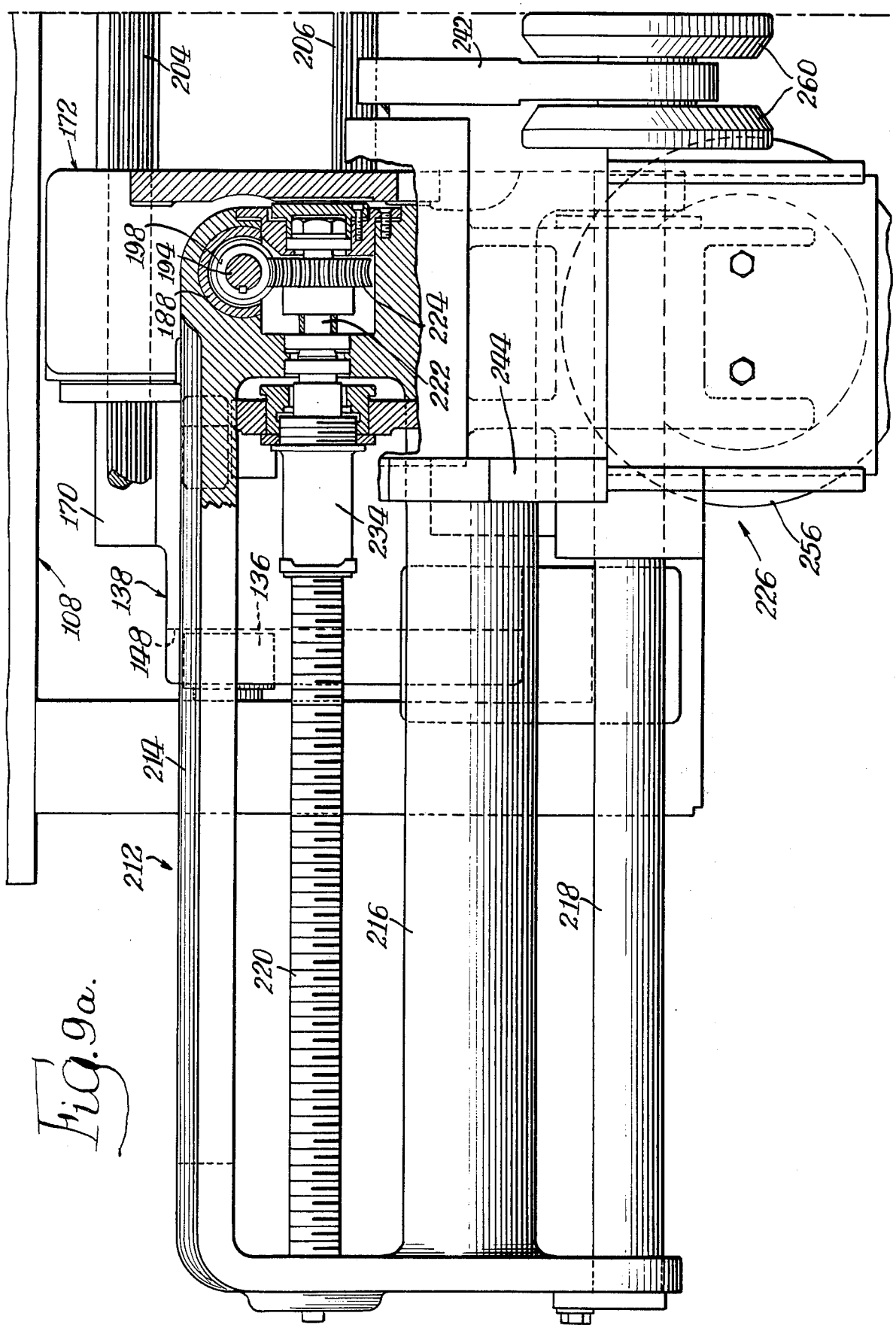

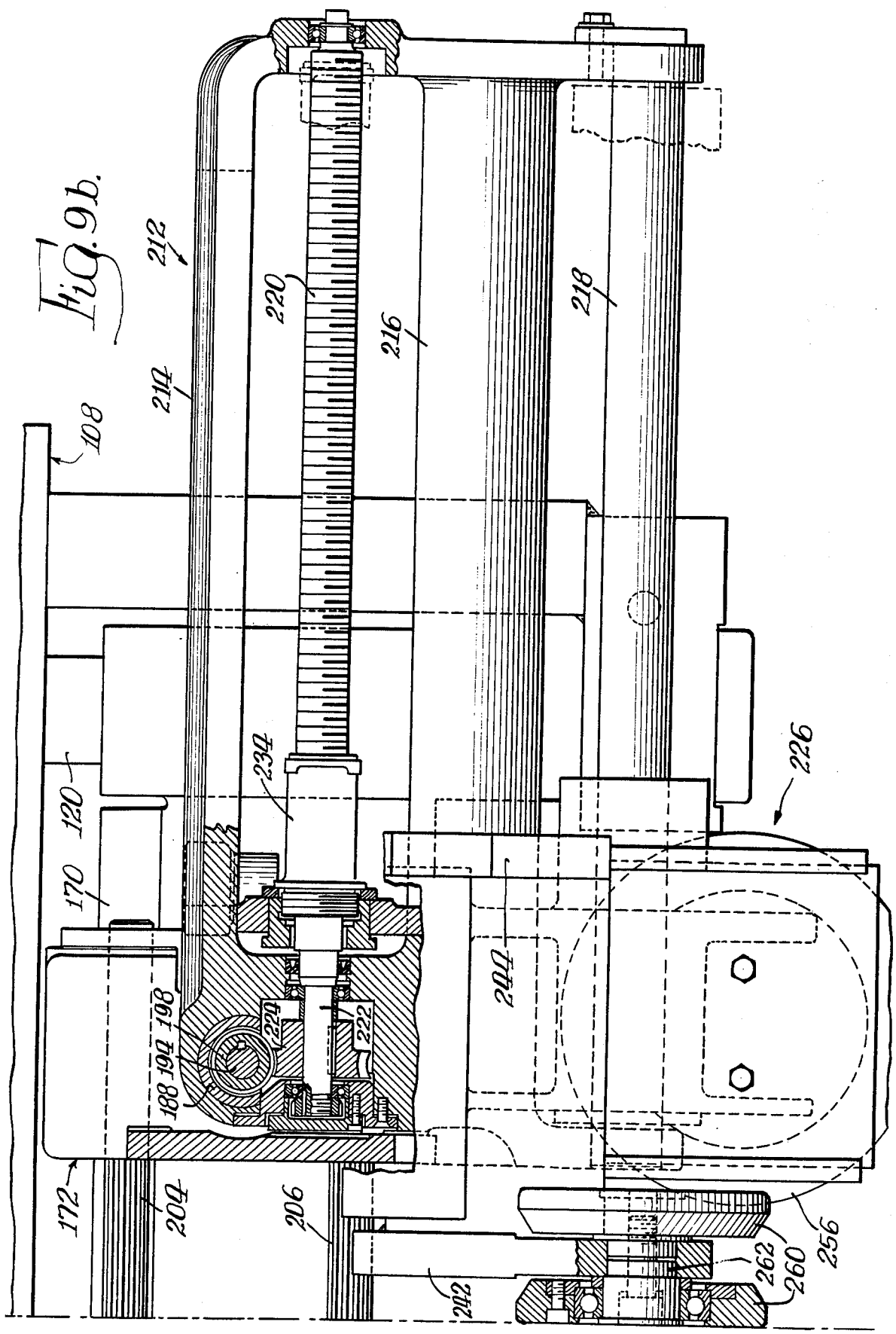

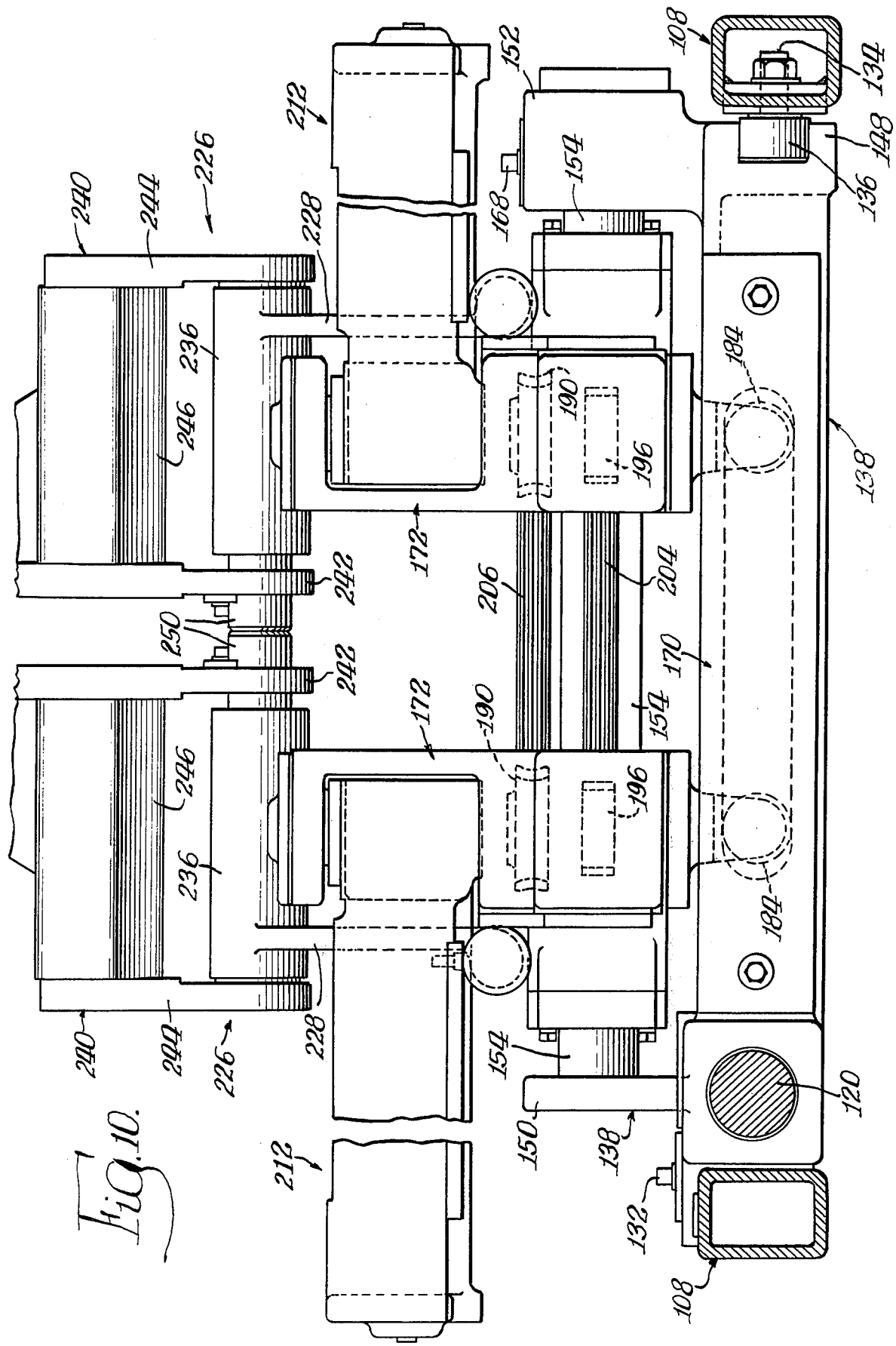

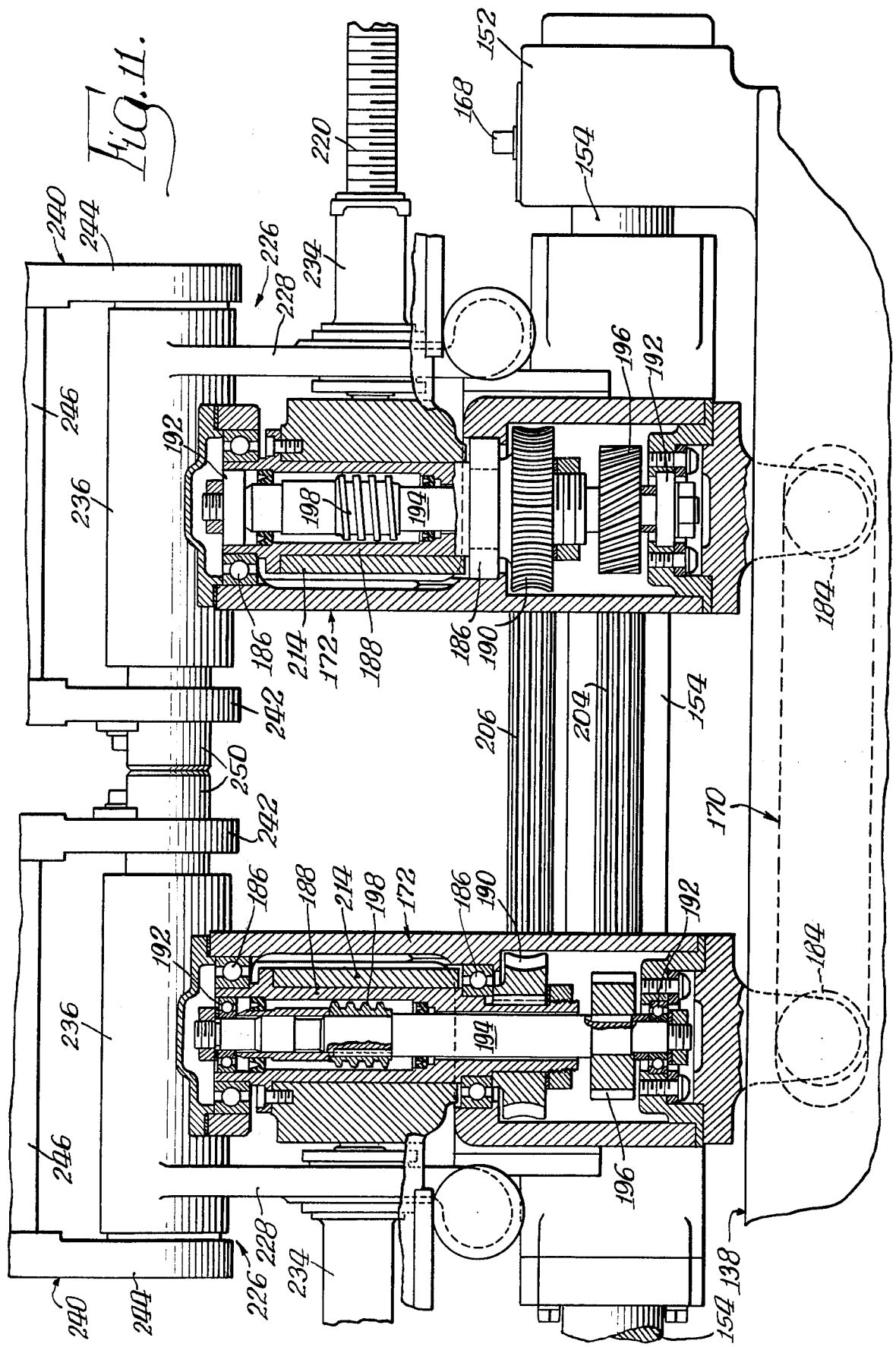

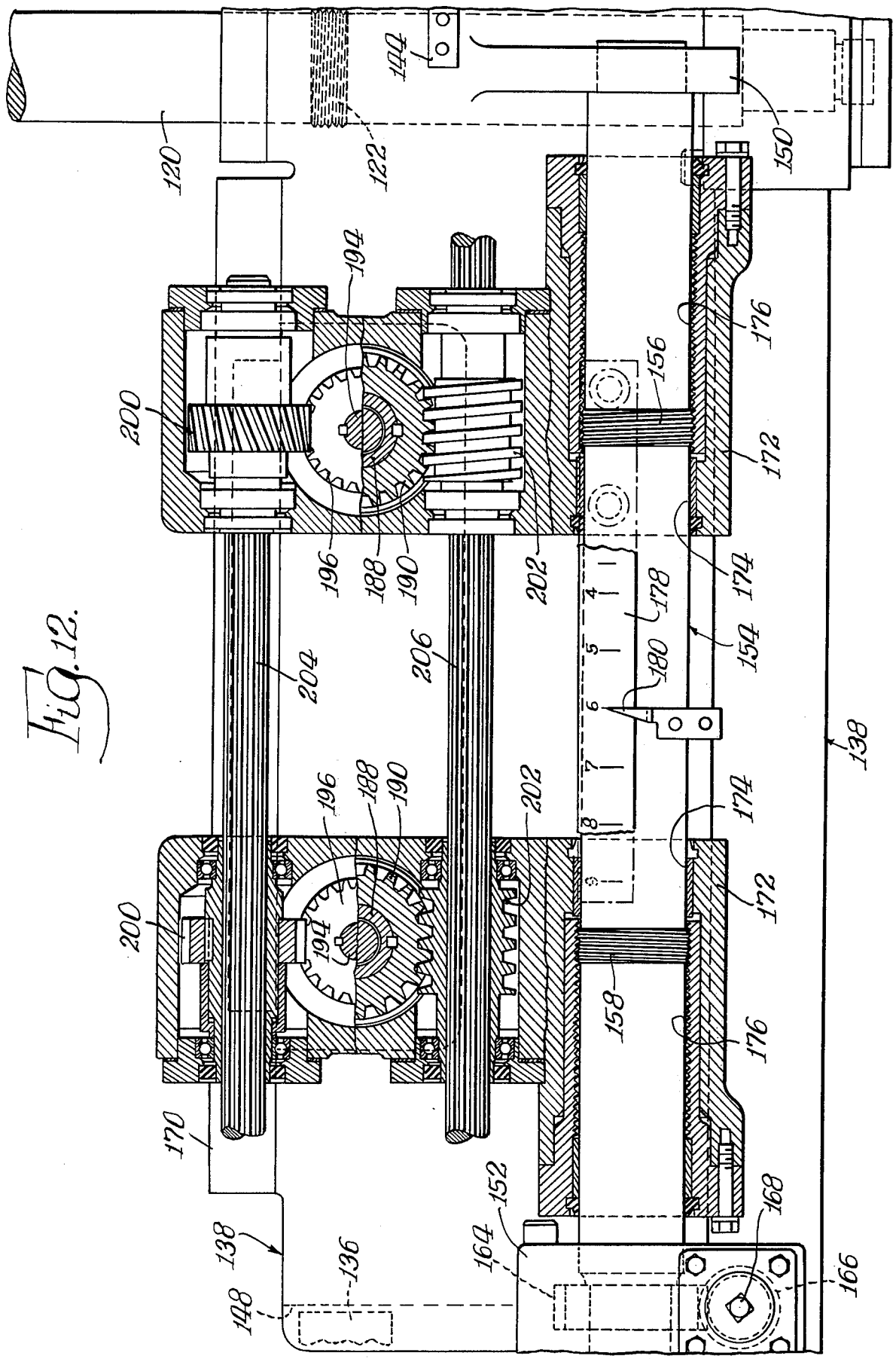

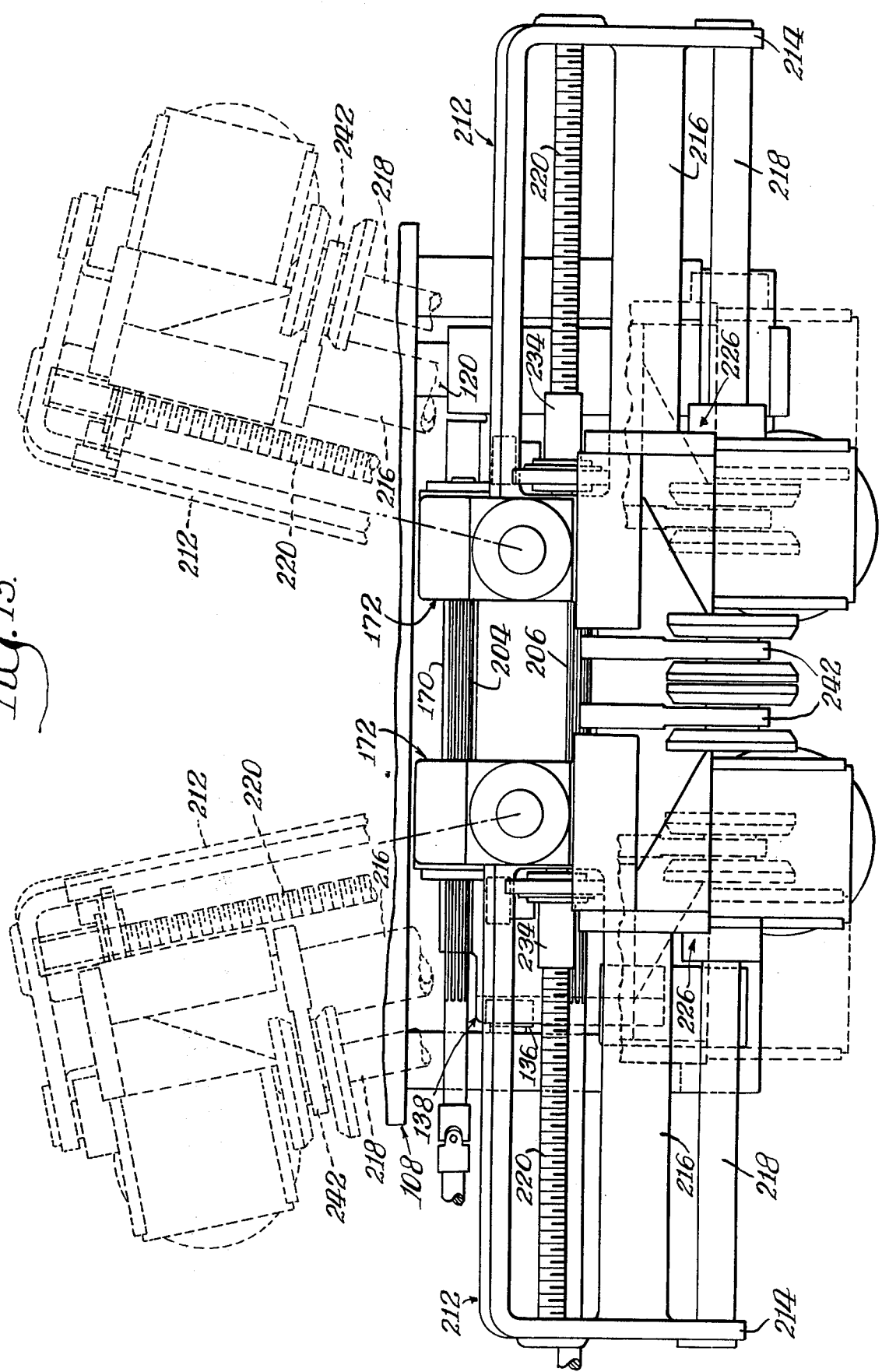

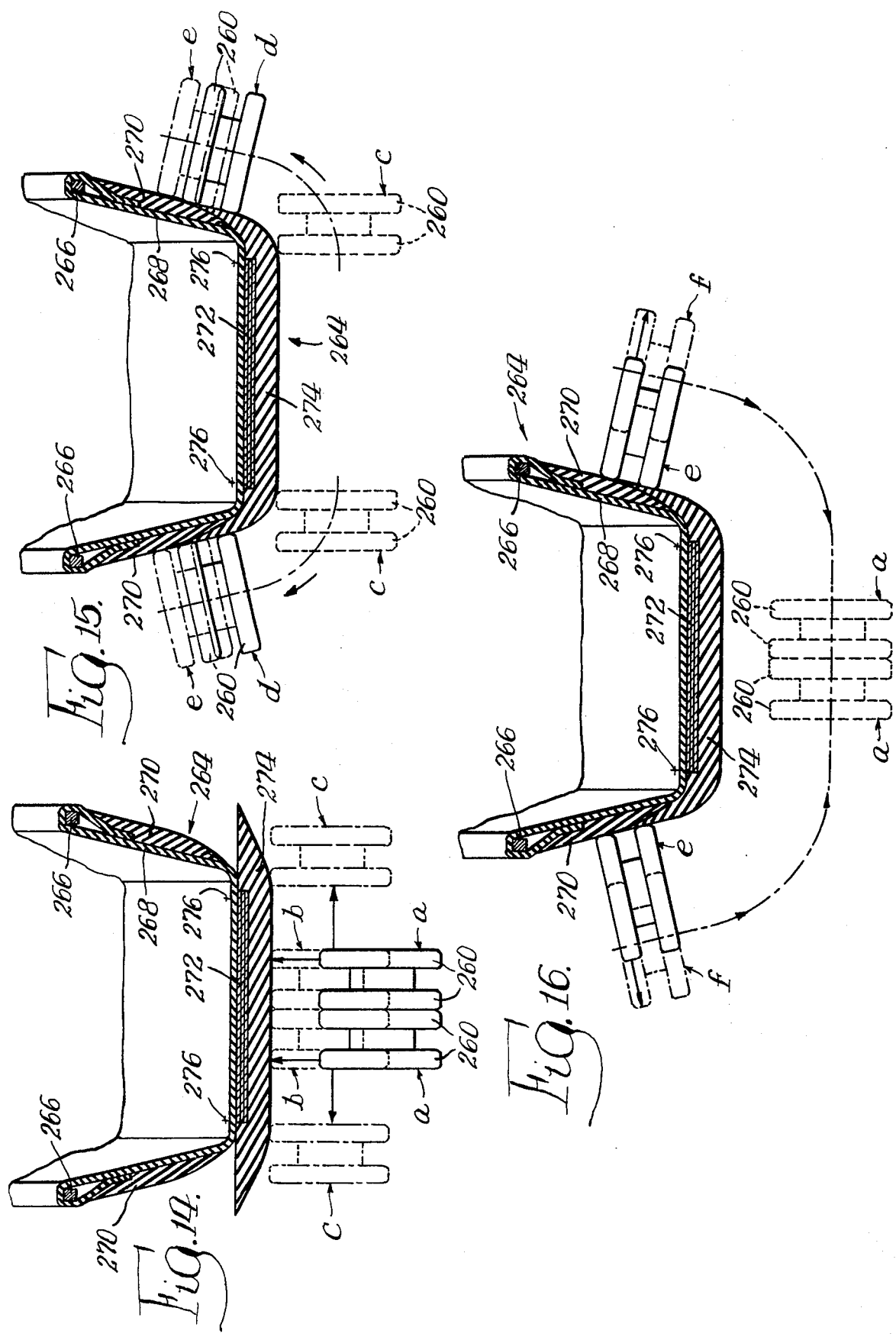

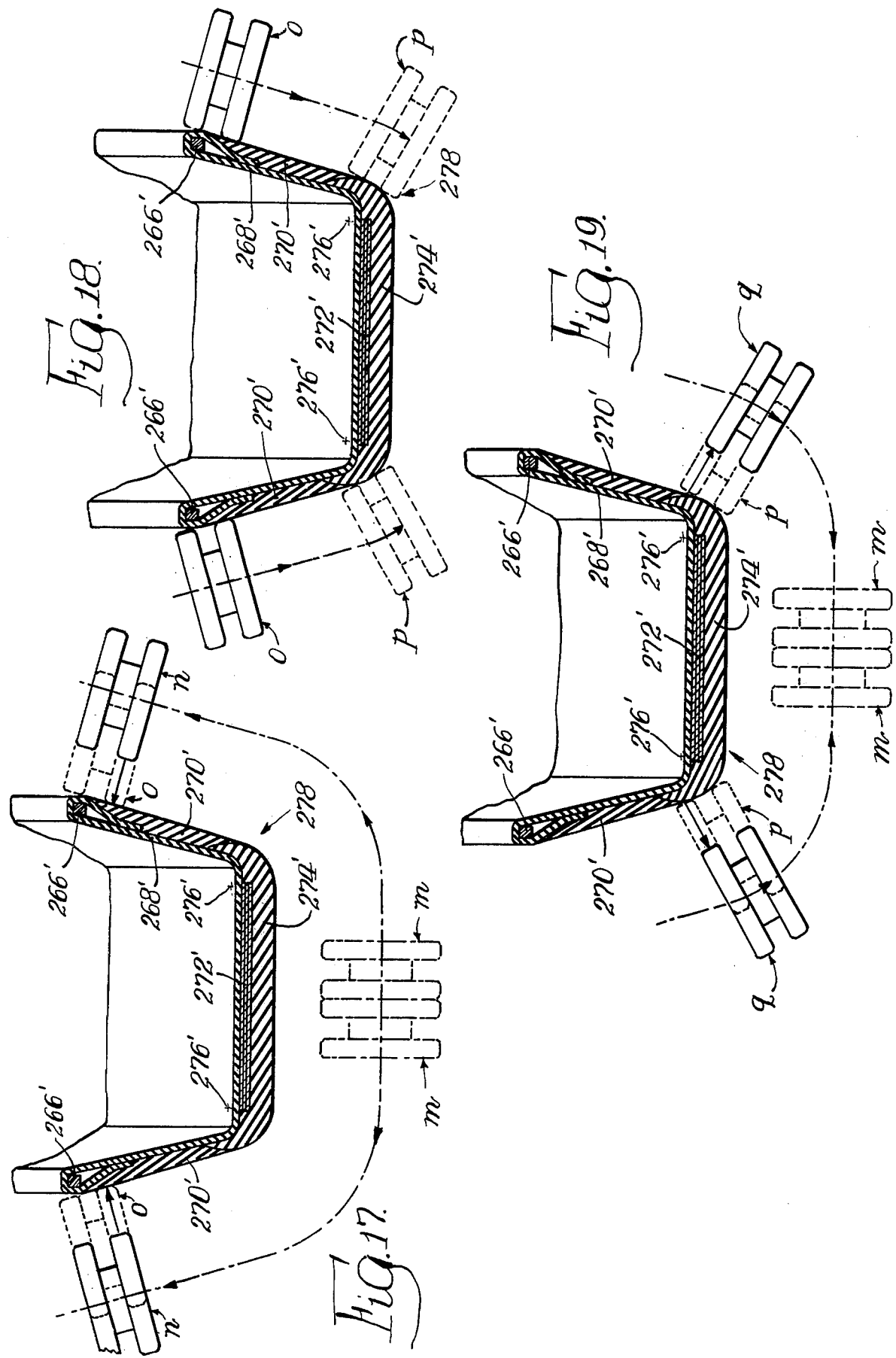

TIRE BUILDING STITCHER ASSEMBLY

FIELD OF THE INVENTION

The present invention is concerned with a stitcher assembly for firmly adhering or stitching tire carcass material and partially applied tread cap and sidewall components to a formed tire carcass.

SUMMARY OF THE INVENTION

The stitcher assembly of the present invention comprises a pair of carrier units, and a pair of arm assemblies one associated with each of the carrier units and having stitcher wheel means. The carrier units are rotatable respectively between two extreme arcuate positions; the arm assemblies are rotatable with the carrier units, and are also linearly movable within the carrier units when the latter are within either of their respective two arcuate positions. During rotation of the carrier units, the stitcher wheel means may be moved arcuately about the corners of the tread cap. During linear movement of the arm asemblies, and depending on the arcuate position of the carrier units, the stitcher wheel means may be moved either linearly across the tire carcass as well as across the periphery of the tread cap or linearly along the faces of the sidewalls.

As will be appreciated, the stitcher assembly of the present invention relies on two elementary motions: rotary and linear. Because these motions are simple and basic, the stitcher assembly is dependable and efficient in operation. Moreover, the indicated motions are carried out in relation to two preset centers of rotation. By reason of this factor coupled with the simplicity of the motions, the stitcher assembly effects uniform stitching with dimensional accurary whereby exceptional stability and balance are imparted to the resulting tire. Further, the spacing between the centers of rotation, and the extent of the rotary and linear motions, are infinitely adjustable to enable the processing of carcasses for tires of different sizes. Finally, the stitcher assembly can be used to build tires in either of the two alternative types of construction: tread-over-sidewall or sidewall-over tread.

BRIEF DESCRIPTION OF THE DRAWINGS

FIG. 1 is a front elevational view of tire building apparatus with which the stitcher assembly of the present invention is incorporated;

FIG. 2 is a plan view of the tire building apparatus of FIG. 1;

FIG. 3 is a view, partly in elevation and partly in section, taken substantially along the line 3—3 in FIG. 2 looking in the direction indicated by the arrows;

FIG. 4 is a view, partly in elevation and partly in section, taken substantially along the line 4—4 in FIG. 3 looking in the direction indicated by the arrows:

FIG. 5 is a view, partly in elevation and partly in section, taken substantially along the line 5—5 in FIG. 3 looking in the direction indicated by the arrows;

FIG. 7 is a view, partly in elevation and partly in section, taken substantially along the line 7—7 in FIG. 3 looking in the direction indicated by the arrows;

FIG. 8 is a view, partly in elevation and partly in section, taken substantially along the line 8—8 in FIG. 7 looking in the direction indicated by the arrows;

FIGS. 9a–9b, joined in end-to-end relation on the dot-dash centerline, show a view, partly in elevation and partly in section, taken substantially along the line 9—9 in FIG. 8 looking in the direction indicated by the arrows;

FIG. 10 is a view, partly in elevation and partly in section, taken substantially along the line 10—10 in FIG. 8 looking in the direction indicated by the arrows;

FIG. 11 is a view, partly in elevation and partly in section, taken substantially along the line 11—11 in FIG. 8 looking in the direction indicated by the arrows;

FIG. 12 is a view partly in elevation and partly in section, taken substantially along the line 12—12 in FIG. 8 looking in the direction indicated by the arrows;

FIG. 13 is an elevational view corresponding generally to FIGS. 9a and 9b and shows three positions of the stitcher wheel;

FIGS. 14, 15 and 16 are partial diametrical sectional views of a tire carcass and show diagrammatically various positions of the stitcher wheels in applying a tread cap over sidewalls; and FIGS. 17, 18 and 19 are partial diametrical sectional views of a tire carcass and show diagrammatically various positions of the stitcher wheels in applying sidewalls over a tread cap.

DESCRIPTION OF THE PREFERRED EMBODIMENT

Figure 6:
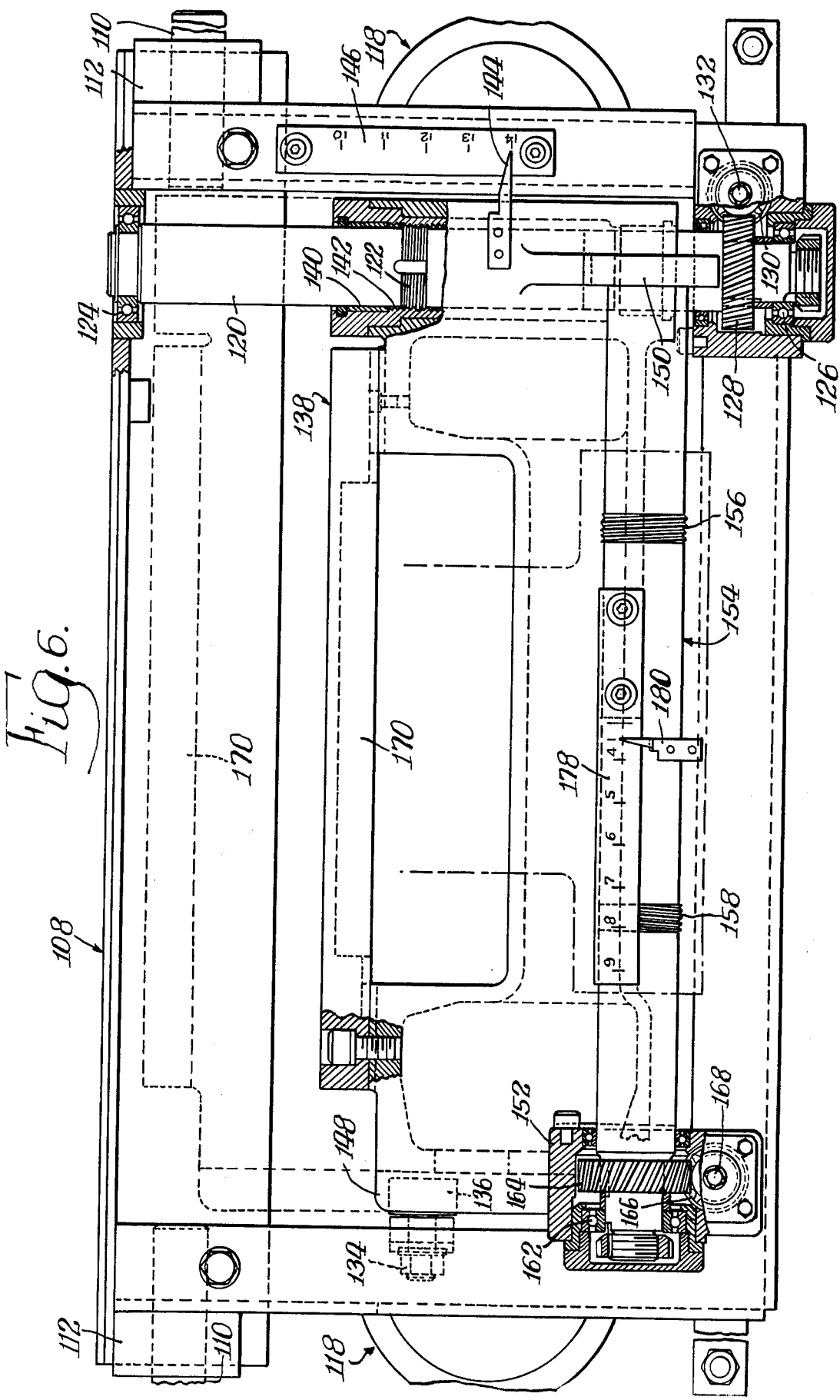
FIG. 6 is a view, partly in elevation and partly in section, taken substantially along the line 6—6 in FIG. 3 looking in the direction indicated by the arrows.

Referring now to FIGS. 1 and 2, there is shown one type of basic tire building apparatus with which the stitcher assembly of the present invention may be incorporated. The basic tire building apparatus comprises main frame means which includes a rear frame section 20 and a front frame section 22. The rear frame section 20 comprises vertical corner frame elements 24 and 26, and upper and lower longitudinal frame elements 28 and 30. The front frame section 22 comprises a longitudinal frame element 32, a vertical corner frame element 34 and an aligned foot extension frame element 36, and an intermediate vertical frame element 38 and an aligned foot extension frame element 40. Extending between the rear and front frame sections 20 and 22 are primary transverse or cross frame elements 42, 44, 46, 48 and 50, secondary transverse or cross frame elements 52 and 54 and a transverse platform 56.

The basic tire building apparatus also comprises rotatable tire building drum means 58 which includes an intermediate expandable drum assembly 60 and end drum assemblies 62 and 64. The drum means 58 is mounted on a hollow main shaft 66 located between a head stock assembly 68 and a variable positionable tail stock assembly 70. The head stock assembly 68 includes a rotatable drive spindle 72, the inner end of which is connected to the adjacent end of the main shaft 66 by means of a coupler unit 74. The outer end of the head stock spindle 72 is drivingly connected, by means of a belt and pully arrangement 76, to an electric motor 78. The tail stock assembly 70 is swingable towards and away from the free end of the main shaft 66 by means of a pneumatic piston and cylinder assembly 80.

Arranged for axial inward and outward movement longitudinally of the drum means 58 are a pair of tire bead placing and end ply bag turn-up ring members 82 and 84. The ring members 82 and 84 are carried by longitudinally elongated frame members 86 and 88 mounted for sliding movement along longitudinally extending stationary shafts 90 and 92. Means for effecting axial movement of the tire bead placing and end ply bag turn-up ring members 82 and 84 comprises elongated lead screw means 94 which is formed with a right-hand thread section 96 and a left-hand thread section 98. The lead screw means 94 is drivingly connected, by means of a selectively operable air clutch-brake unit 100 and a belt and pulley arrangement 102, to an electric motor 104.

The specific type of basic tire building apparatus described above does not form part of the present invention. Further details of the construction and operation thereof are disclosed in the copending application of Edwin E. Mallory, Ser. No. 375,750, filed July 2, 1973; the drum means 58 may be of a construction as shown and described in U.S. Pat. 3,684,621, issued in the names of Larry C. Frazier and Emerson C. Bryant, on Aug. 15, 1972, and the copending application of Edwin E. Mallory and Emerson C. Bryant, Ser. No. 173,769 filed Aug. 23, 1971.

Arranged generally below the tire building drum means 58 is the stitcher assembly 106 of the present invention.

The stitcher assembly 106, as shown in FIGS. 3 and 4, comprises a generally rectangular upright longitudinally extending base fame 108 having bearing plate means 109. The upper end of the base frame 108 has outwardly directed stub shafts 110 rotatably mounted in trunions 112 carried at the upper ends of side bracket units 114 which are secured adjacent their lower ends to the secondary cross female elements 52 and 54 and which are interconnected by a cross brace 116. In this manner, the base frame 108 is pivotally mounted to the main frame means about an axis parallel to the axis of the drum means 58. Means for locating the base frame 108 in predetermined pivoted or tilted positions, as shown in FIG. 3, includes first adjustable stop means 111 carried by the base frame 108 and engageable with a bearing block 113 attached to the side bracket 114, second adjustable stop means 117 carried by the side bracket 114 and engageable by the bearing plate means 109, and air bag units 118 arranged between the cross brace 116 and the base frame 108.

Referring to FIGS. 5 and 6, at the right-hand side of the base frame 108, and upright shaft 120, having an intermediate threaded section 122, is journaled at its ends in upper and lower ball bearing assemblies 124 and 126 located in the frame 108. Secured to the lower end of the shaft 120 is a helical gear 128 which has meshing engagement with a helical pinion 130 secured to a manually operable rod 132 rotatably mounted in the frame 108. Secured in the left-hand side of the base frame 108 is a laterally inwardly projecting center bolt 134 which carries a guide roller 136.

Mounted within the base frame 108 is a carriage frame 138. Adjacent its right-hand side, the carriage frame 138 is provided with an opening 140 having a threaded section 142 engaged with the threaded section 122 of the shaft 120. The carriage frame 138 is supported by the shaft 120 and is adjustable therealong, in a direction normal to an axis parallel to the axis of the drum means 58, between the solid-line and dotted-line positions shown in FIG. 6 by rotation of the manually operable rod 132. The adjusted position of the frame 138 is indicated by a pointer 144 secured to the frame 138 and movable across the face of a scale 146 secured to the base frame 108. Along its left-hand side, the carriage frame 138 is provided with a C-shaped track section 148 which is engaged about the guide roller 136.

Along its bottom portion, the carriage frame 138 (FIGS. 5 and 6) is provided with forwardly projecting side frame extensions 150 and 152. A horizontal shaft 154, having a right-hand thread section 156 and a left-hand thread section 158, is journaled at its ends in ball bearing assemblies 160 and 162 located in the frame extensions 150 and 152. Secured to the left-hand end of the shaft 154 is a helical gear 164 which has meshing engagement with a helical pinion 166 secured to a manually operable rod 168 rotatably mounted in the frame extension 152. Along its top portion, the carriage frame 138 is provided with an inverted U-shaped track section 170.

Mounted within the carriage frame 138 (FIGS. 8 and 10) are a pair of generally inverted L-shaped carrier supports 172 with the horizontal leg portions thereof projecting forwardly. As shown in FIG. 12, each carrier support 172, adjacent its lower end, is provided with a horizontal opening 174 having a threaded section 176 engaged with the adjacent thread section 156 or 158 of the shaft 154. The carrier supports 172 are supported by the shaft 154 and are horizontally adjustable therealong toward and away from each other, in a direction parallel to the axis of the drum means 58, by rotation of the manually operable rod 168. The position of the carrier supports 172 is indicated by a scale 178 secured to one of the supports 172 and movable under a pointer 180 secured to the carriage frame 138. Secured at the back side of each carrier support 172 (FIG. 8) is a vertical bolt 182 which carries a guide roller 184 engaged in the carriage track section 170.

As shown in FIG. 11, the horizontal leg portion of each carrier support 172 is hollow and open on one side. Journaled for rotation therein, by means of ball bearing assemblies 186, is a longitudinally-slotted tubular shaft 188 having a worm gear 190 secured thereto. Journaled for rotation within the tubular shaft 188, by means of ball bearing assemblies 192, is a spindle 194 having a helical gear 196 and a worm 198 secured thereto. The gears 196 and 190 (FIG. 12) having meshing engagement respectively with a helical gear 200 and a worm 202. The corresponding gears 200 and worms 202 of each carrier support 172, in turn, are keyed respectively to elongated rods 204 and 206 journaled in the carrier supports 172. Rotation of the rod 204 effects rotation of the gears 200, gears 196 spindles 194 and worms 198. Rotation of the rod 206 effects rotation of the worms 202, gears 190 and tubular shafts 188. The rods 204 and 206, as shown in FIG. 2, are connected, for selective rotation in either direction, to electric motors 208 and 210 respectively.

Journaled in each carrier support 172, as shown in FIGS. 9a and 9b, is a laterally extending carrier unit 212. Each carrier unit 212 comprises an inverted generally U-shaped frame 214 with an integral intermediate lengthwise brace 216. A lower lengthwise support bar 218 is secured in the frame 214; and an upper lengthwise threaded lead or ball screw 220 is journaled in the frame 214 and has a shank portion 222 at its inner end. The upper inner corner portion of the frame 214 is supported by and secured to the adjacent tubular shaft 188, and a worm gear 224 secured to the shank portion 222 of the lead screw 220 had meshing engagement with the worm 198 on the spindle 194. The carrier units 212 are rotatable by and with the tubular shafts 188, for example, between the solid-line and dotted-line positions shown in FIG. 13. The axes of rotation of the carrier units 212 lie in parallel planes normal to the axis of the drum means 58 and in a common plane parallel to the axis of the drum means 58. The lead screws 220 are rotatable by and with the gears 224.

Mounted within each carrier unit 212, as shown in FIGS. 7, 8 and 11, is a stitcher arm assembly 226. Each arm assembly 226 (FIG. 8) comprises a forwardly extending generally C-shaped arm support 228. The lower end of the arm support 228 is formed with a depending flange 230 and with a hub section 232 supported on the lower support bar 218 of the carrier unit 212; the upper end of the arm support 228 (FIG. 11) has rotatably secured therein a collar member or ball nut 234 threadingly connected with the lead or ball screw 220; and the intermediate forward portion of the arm support 228 is formed with a sleeve section 236 having an internal shoulder 238 (FIG. 7).

Supported by each sleeve section 236 (FIGS. 7 and 8) is a stitcher arm unit 240 comprised of a forwardly projecting primary arm section 242, a secondary arm section 244 laterally spaced from the primary arm section 242 by a body section 246, and a depending flange 248. The rear ends of the arm sections 242 and 244 are secured to a pin member 250 which extends through the sleeve section 236 and which is formed with a shoulder 252. A coil spring 254 is disposed within the sleeve section 236 about the pin member 250 and is engaged at its ends with the sleeve shoulder 238 and shaft shoulder 252. An air bag unit 256 is mounted between the flanges 230 and 248 for effecting upward pivotal movement of the stitcher arm unit 240 relative to the arm support 228, and a return spring 258 is connected between the hub section 232 and the flange 248. A pair of stitcher wheels 260 are carried at the outer end of the primary arm section 242. The stitcher wheels 260 are rotatably mounted on the ends of a transverse pin unit 262 secured in the primary arm section 242.

The arm assemblies 226 are linearly movable within the carrier units 212 toward and away from each other through rotation of the lead screws 220. Referring to FIG. 7, inward movement of the arm units 240 and stitcher wheels 260 stops upon abutment of the adjacent ends of the pin member 250; however, precision stopping of the lead screws 220 is not required because the spring-loaded lost-motion mountings of the pin members 250 accommodates overrun of the arm supports 228. In relation to a tire being built, the arm assemblies 226 are linearly movable on a common axis parallel to the periphery of the tire carcass and the tire tread cap and on separate axes parallel to the respective tire sidewalls.

Prior to building a tire: the air bag units 118 and 256 are deflated whereby the stop 111 abuts the block 113 (FIG. 3) and the stitcher arm units 240 are disposed in the dash line position shown in FIGS. 3 and 8; and the carriage frame 138 is manually adjusted along the shaft 120 (FIG. 6), and the carrier supports 172 are manually adjusted along the shaft 154 (FIG. 12), to adjust the stitcher assembly 106 to the size of the tire being built and to dispose the axes of rotation of the carrier units 212 (i.e., the axes of the tubular shafts 188, FIG. 11) in preset positions substantially intersecting the respective centers of curvature 276 of the tire arcs (to be described in connection with FIGS. 14–16) perpendicular to the diametrical plane of the arcs.

To form a tire carcass to which either a tread cap may be applied over sidewalls or sidewalls applied over a tread cap, carcass materials in a conventional manner are first applied to the building drum means 58 (FIGS. 1 and 2). Then, the air bag units 118 and 256 are inflated whereby the base frame 108 is pivoted upwardly with the bearing plate means 109 engaged against the stop means 117 (FIG. 3) and the arm units 240 are pivoted to the dot-dash line position shown in FIG. 3 in condition for stitching the carcass material; the stitcher wheels 260 are moved axially apart from the center of the periphery of the carcass material across the periphery thereof by linear movement of the arm assemblies 226 within the carrier units 212 to stitch the carcass material; the air bag unit 118 and 256 are deflated whereby the stitcher arm units 240 are again disposed in the dash line position shown in FIGS. 3 and 8; and the stitcher wheels 260 are returned axially back together to the center of the periphery of the formed tire carcass by linear movement of the arm assemblies 226 within the carrier units 212. Thereafter, in a conventional manner beads are positioned and locked in place. The intermediate expandable drum assembly 60 is then expanded.

When a tread cap is to be applied over sidewalls, the carcass end plies are turned-up and sidewall components are applied in a conventional manner, the sidewall components are stitched in a manner corresponding generally to that to be described in connection with FIGS. 17–19, and breaker and tread cap components are applied in a conventional manner. A portion of a tire 264 at this stage of construction is shown in FIG. 14. The tire 264 comprises beads 266, plies and liner 268, sidewalls 270, a breaker 272, and a tread cap 274. The points 276 each represent the center of curvature of a tire arc (in a diametrical plane) approximately joining the tread cap 274 and an adjacent sidewall 270, or more specifically joining a line on the periphery of the tread cap 274 parallel to the axis of the tire 264 and drum means 58 and a line on the face of the adjacent sidewall 270 intersecting the axis of the tire 264 and drum means 58. FIGS. 14–16 show diagrammatically various positions of the stitcher wheels 260 in applying the tread cap 274 over the sidewalls 270. During stitching of the tread cap 274, the stitcher wheels 260 are moved in the following sequence: (FIG. 14) from starting positions $a$ to positions $b$ against the tire cap 274 by pivoting the arm assemblies 226 from the dash line position shown in FIGS. 3 and 8 to the solid line position through inflation of the air bag units 256, and from positions $b$ to positions $c$ across the periphery of the tread cap 274 by linear movement of the arm assemblies 226 within the carrier units 212; (FIG. 15) from positions $c$ to positions $d$ by rotation of the carrier units 212 substantially about the respective centers of curvature 276, and from positions $d$ to positions $e$ along the edges of the tread cap 274 and along portions of the faces of the sidewalls 270 by further linear movement of the arm assemblies 226 within the carrier units 212; and (FIG. 16) from positions $e$ to positions $f$ by pivoting of the arm assemblies 226 from the solid line position shown in FIGS. 3 and 8 to the dash line position through deflation of the air bag units 256, and from positions $f$ back to starting positions $a$ by linear movement of the arm assemblies 226 within the carrier units 212 and by rotation of the latter substantially about the respective centers of curvature 276.

When sidewalls are to be applied over a tread cap, breaker and tread cap components are applied to a preformed carcass in a conventional manner, the breaker and tread cap components are stitched in a manner corresponding generally to that previously described in connection with FIGS. 14–16, and the carcass end plies are turned up and sidewall components are applied in a conventional manner. A portion of a tire 278 at this stage of construction is shown in FIG. 17. Prime reference numerals have been used to identify components and points of tire 278 which are substantially the same or similar to those of tire 264 described in connection with FIGS. 14–16. FIGS. 17-19 also show diagrammatically various positions of the stitcher wheels 260 in applying the sidewalls 270' over the tread cap 274'. During stitching of the sidewalls 270', the stitcher wheels 260 are moved in the following sequence: (FIG. 17) from starting positions m to positions n by linear movement of the arm assemblies 226 within the carrier units 212 and by rotation of the latter substantially about the respective centers of curvature 276', and from positions n to positions o by pivoting of the arm assemblies 226 through inflation of the air bag units 256; (FIG. 18) from positions o to positions p along the faces of the sidewalls 270' and along portions of the edges of the trade cap 274'; and (FIG. 19) from positions p to positions q by pivoting of the arm assemblies 226 through deflation of the air bag units 256, and from positions q back to starting positions m by rotation of the carrier units 212 substantially about the respective centers 276' and by linear movement of the arm assemblies 226 within the carrier units 212.

Although the stitcher assembly is shown as operating in linear and rotational modes independently, it should be understood that the motions can be programmed to operate simultaneously. Such a programmed operation would be desirable, for instance, if the tread cap were curved rather than linear as shown.

While there has been shown and described a preferred embodiment of the present invention, it will be understood by those skilled in the art that various rearrangements and modifications may be made therein without departing from the spirit and scope of the invention.

The invention claimed is:

1. In tire building apparatus having main frame means, and rotatable tire building drum means supported by the main frame means and in turn supporting a formed tire carcass with partially applied tread cap and/or sidewall components, a stitcher assembly comprising: a pair of carrier units; means for supporting and rotating said carrier units relative to the main frame means; a pair of arm assemblies one associated with each of said carrier units; means for supporting and linearly moving said arm assemblies with respect to said carrier units; each of said arm assemblies including an arm support supported and linearly movable within the associated one of said carrier units, an arm unit mounted on said arm support and movable with respect thereto and carrying stitcher wheel means, and means for resiliently moving said arm unit; and said stitcher wheel means being in substantially abutting relationship at the midpoint of the tread at the start of the tread stitching operation.

2. The stitcher assembly of claim 1 wherein said carrier units are rotatable about axes which lie in parallel planes normal to the axis of the drum means and in a common plane parallel to the axis of the drum means, and wherein said arm assemblies are linearly movable on axes in a plane parallel to the axis of the drum means.

3. The stitcher assembly of claim 2 wherein each of said carrier units is rotatable about an axis substantially intersecting the center of curvature of an arc approximately joining the tread cap and an adjacent tire sidewall, and wherein said arm assemblies are linearly movable on a common axis substantially parallel to the tire tread cap and on separated axes substantially parallel to the respective tire sidewalls.

4. The stitcher assembly of claim 1 wherein said means for supporting and linearly moving said arm assemblies comprises a pair of support bars one secured in each of said carrier units, a pair of threaded lead screws one journaled in each of said carrier units, and power means for rotating said lead screws; and wherein said arm assemblies have sliding engagement with said support bars and threading connection with said lead screws.

5. The stitcher assembly of claim 1 including a pair of carrier supports supported by the main frame means, and means for supporting and rotating said carrier units within said carrier supports.

6. The stitcher assembly of claim 5 wherein said means for supporting and rotating said carrier units comprises a pair of rotatable shafts one journaled in each of said carrier supports, and power means for rotating said shafts; and wherein said carrier units are secured to said shafts.

7. The stitcher assembly of claim 5 wherein said means for supporting and rotating said carrier units comprises a pair of rotatable tubular shafts one journaled in each of said carrier supports, and power means for rotating said shafts; wherein said carrier units are secured to said shafts; wherein said means for supporting and linearly moving said arm assemblies comprises a pair of support bars one secured in each of said carrier units, a pair of threaded lead screws one journaled in each of said carrier units, a pair of spindles one journaled in each of said shafts, gear means between said spindles and said lead screws, and power means for rotating said spindles; and wherein said arm assemblies have sliding engagement with said support bars and threading connection with said lead screws.

8. The stitcher assembly of claim 5 including a carriage frame supported by the main frame means, and means for supporting said carrier supports within said carriage frame and for adjusting the same in a direction parallel to the axis of the drum means.

9. The stitcher assembly of claim 8 wherein said carriage frame is pivotally mounted about an axis parallel to the axis of the drum means.

10. The stitcher assembly of claim 1 wherein said means for supporting and adjusting said carrier supports comprises a rotatable shaft journaled in said carriage frame and having right-hand and left-hand thread sections, and an opening in each of carrier supports and having a threaded section engaged with one of the thread sections of said shaft.

11. The stitcher assembly of claim 10 including a base frame supported by the main frame means, and means for supporting said carriage frame within said base frame and for adjusting the same in a direction normal to an axis parallel to the axis of the drum means.

12. The stitcher assembly of claim 11 wherein said means for supporting and adjusting said carriage frame comprises a rotatable shaft journaled in said base frame and having a threaded section, and an opening formed in said carriage frame and having a threaded section engaged with the threaded section of said shaft journaled in said base frame.

13. The stitcher assembly of claim 12 wherein said base frame is pivotally mounted to the main frame means and about an axis parallel to the axis of the drum means and including means for locating said base frame in predetermined pivoted positions.

14. The stitcher assembly of claim 13 wherein said means for supporting and rotating said carrier units comprises a pair of rotatable tubular shafts one journaled in each of said carrier supports, and power means for rotating said shafts; wherein said carrier units are secured to said shafts; wherein said means for supporting and linearly moving said arm assemblies comprises a pair of support bars one secured in each of said carrier units, a pair of threaded lead screws one journaled in each of said carrier units, a pair of spindles one journaled in each of said shafts, gear means between said spindles and said lead screws, and power means for rotating said spindles; and wherein said arm assemblies have sliding engagement with said support bars and threading connection with said lead screws.

15. The stitcher assembly of claim 14 wherein said carrier units are rotatable about axes which lie in parallel planes normal to the axis of the drum means and in a common plane parallel to the axis of the drum means, wherein each of said carrier units is rotatable about an axis substantially intersecting the center of curvature of an arc approximately joining the tread cap and an adjacent tire sidewall, and wherein said arm assemblies are linearly movable on a common axis parallel to the tire tread cap and on separate axes parallel to the respective tire sidewalls.

* * * * *